Patented Jan. 16, 1940

2,187,453

UNITED STATES PATENT OFFICE 2,187,453

PROCESS FOR PRODUCING DYEINGS

Charles Graenacher, Riehen, Switzerland, assignor to the firm of Society of Chemical Industry in Basle, Basel, Switzerland No Drawing. Application July 5, 1938, Serial No. 217,633. In Switzerland July 10, 1937

10 Claims. (Cl. 8—49)

In specification No. 2,095,600 and applications Serial Nos. 92244 and 92245 of 1936 and No. 173,528 of 1937 there are described water soluble acyl derivatives of sparingly soluble dyestuffs which contain in the acyl residue groups determining water-solubility. In the said specification it is explained how such derivatives may be used for producing dyeings by treating them on the substratum, for instance vegetable fiber, with a saponifying agent.

It has now been found that quite generally a certain difficulty consists therein that such easily soluble acyl derivatives can be more or less dissolved from the fiber during the saponification. This is particularly the case if the affinity of the new ester-like derivatives for the substrata is not very pronounced. Whereas this affinity is rather pronounced in certain substrata such as textiles of animal origin, for example wool or silk, it is smaller with substrata of vegetable origin, for example textiles from cellulose (this term comprising both regenerated and native cellulose). In such cases it is necessary to conduct the treatment with the saponifying agents under more energetic conditions with regard to the hydroxyl ion concentration of the saponifying liquid. Thus it is avoided that, preceding the saponification, the water-soluble salts of the ester-like products are dissolved in part from the fibre by the treating liquor. Apart from the fact that such a method of working does not always lead to quite satisfactory results, there is a disadvantage if the substratum or the final dyestuff is sensitive to caustic alkali.

It has now been found that by the selection of suitable conditions it is possible to reduce the dissolution of the water-soluble acyl derivatives from the substratum previously to their saponification to a minimum, so that with regard to the duration of the saponification and the hydroxyl ion concentration of the saponifying liquid one is in a position to select for the saponification the most favorable conditions with respect to the substratum, sensitiveness to alkali of the dyestuffs, and the apparatuses. These conditions exist for example when carrying out the operation in the presence of water-soluble salts which reduce the solubility of the ester-like products on the fiber, either by applying them in greater quantities or by converting the ester-like product into sparingly soluble salts by double reaction.

In the former case there may be used salts such as sodium chloride or sodium sulfate, ammonium chloride, potassium chloride, potassium sulfate, ammonium sulfate or magnesium chloride (the latter preferably in the presence of ammonium salts such as ammonium chloride). Such salts may simultaneously also be used as saponifying agents, this is the case if salts having an alkaline reaction are used, such as for example alkali phosphates or alkali carbonates.

In the latter case it is advantageous to use barium chloride, calcium chloride, barium nitrate, zinc chloride, aluminium sulfate and the like. This manner of working is the subject matter of my divisional application Serial No. 261,842, filed March 14, 1939. Working may also be effected in such a manner that the use of a bath in the treatment with the saponifying agents is avoided. This may be brought about for example by a treatment with basic vapors such as ammonia gas or organic amines in the form of vapor. This manner of working is the subject matter of my divisional application Serial No. 261,841, filed March 14, 1939.

When carrying out the operation in aqueous baths there are preferably used such hydroxyl ion concentrations which correspond to N/10 up to almost N-solutions of hydroxides of the alkali metals. Preferably N/10 to N/15 solutions are used. If desired, there may of course also be used higher concentrations of caustic alkalies.

The treating liquors may contain further additions, determined by the nature of the fabric, by any accompanying dyestuffs which may be fixed on the fibre by some other method or by other reasons. Such additional substances are wetting agents, agents promoting penetration, thickening agents, oxidizing agents or the like.

The process of the invention is not only applicable to the products of the aforesaid U. S. patent specifications. It may be used quite generally for water-soluble acyl derivatives of sparingly soluble dyestuffs which contain in the acyl residue a group determining solubility in water (for instance, the products of the U. S. Patent Appln. S. N. 173,528, filed November 8, 1937). It is suitable both for dyeing in the narrower sense and for printing.

The following examples illustrate the invention:

Example 1

A printing paste is prepared as follows:

| | Grams |
|---|---|
| The product of the action of meta-benzoic acid sulfo-chloride on the azo-dyestuff from diazotized 3-chloraniline and the anilide of 2:3-hydroxynaphthoic acid | 80 |
| Thiodiglycol | 150 |
| Water | 240 |
| Neutral starch tragacanth thickening | 500 |
| Trisodium phosphate solution 1:2 | 30 |
| | 1000 |

A fabric which may consist of cotton, artificial silk from regenerated cellulose, natural silk or wool, or of a mixture of these fibers is printed with this paste, dried, and treated in the Mather- Platt apparatus for 5-10 minutes; the print is then drawn at room temperature through an approximately saturated solution of common salt containing per litre 6-7 grams of sodium hydroxide; it is then lightly squeezed and then allowed to dry in rolled-up or folded state for 1-2 hours at room temperature. It is then rinsed cold, soured hot, rinsed and soaped at the boil for 10-15 minutes. The print is then an intense brilliant orange-red. The quantity of sodium hydroxide may be increased without disadvantage, for example up to 9 grams per litre.

A yellow print may be obtained by substituting 80 grams of the product of the action of meta-benzoic acid sulfochloride on the ternary condensation product from 1 mol of cyanuric chloride, 2 mols of α-amino-anthraquinone and 1 mol of aniline for the 80 grams of the product from meta-benzoic acid sulfochloride used above.

*Example 2*

The following printing paste is made:

| | Grams |
|---|---|
| The product of the reaction of benzoyl chloride sulfonic acid on the azo-dyestuff from diazotized 2:5-dichloraniline and the ortho-anisidide of 2:3-hydroxynaphthoic acid | 60 |
| Water | 260 |
| S-ethylthioglycollic acid amide ($C_2H_5$—S—$CH_2$—C—$NH_2$) with O double bond | 150 |
| Neutral starch tragacanth thickening | 500 |
| Trisodium phosphate solution 1:2 | 30 |
| | 1000 |

This paste is printed on viscose crepe which is then dried and treated in the Mather-Platt apparatus for 5-10 minutes. The print is then heated in the reeling vat for 5 minutes at 25° C. with an approximately saturated solution of common salt or sodium sulfate containing per litre 6-7 grams of sodium hydroxide. It is then rinsed cold, soured, rinsed again and soaped at 70° C. There is obtained a brilliant scarlet red print.

*Example 3*

The following printing paste is prepared:

| | Grams |
|---|---|
| The product of the action of meta-benzoic acid sulfochloride on the azo-dyestuff from diazotized 4-(4'-methyl)-phenoxyacetylamino-2:5-dimethoxy-1-aminobenzene and the 3-nitranilide of 2:3-hydroxynaphthoic acid | 60 |
| Water | 140 |
| Thiodiglycol | 150 |
| Urea | 100 |
| Neutral starch tragacanth thickening | 500 |
| Trisodium phosphate solution 1:4 | 50 |
| | 1000 |

This paste is printed on a fabric which may consist of viscose satin or of cotton or a mixture of cotton and artificial silk from regenerated cellulose, which is then dried and treated in the Mather-Platt apparatus for 5-10 minutes. The print is then treated in the reeling vat for 5 minutes at 25° C. with an aqueous solution containing per litre 10 grams of crystallized barium chloride and 10 grams of sodium hydroxide. The print is then rinsed as described above, soured and soaped. There is obtained an intense fast violet print on the artificial silk.

The procedure is similar with other fibers such as silk or wool or with mixtures of such fibers with those of the preceding paragraph.

If necessary the barium chloride may be replaced by calcium chloride, strontium nitrate or magnesium chloride (in the presence of ammonium chloride). The sodium hydroxide may also be replaced by potassium hydroxide and, if desired, there may be used greater quantities of caustic alkalies.

*Example 4*

The following two printing pastes are prepared:

(a)

| | |
|---|---|
| The product of the action of meta-benzoic acid sulfochloride on the azo-dyestuff from diazotized 3-chloraniline and the anilide of 2:3-hydroxynaphthoic acid grams | 80 |
| Water cc | 270 |
| Urea grams | 50 |
| Resorcinol do | 50 |
| Neutral starch tragacanth thickening grams | 550 |
| Grams | 1000 |

(b)

| | |
|---|---|
| A paste of 20 per cent strength of tetrabromindigo grams | 150 |
| Potash thickening do | 650 |
| Sodium sulfoxylate formaldehyde grams | 80 |
| Urea do | 80 |
| Water do | 40 |
| Grams | 1000 |

The potash thickening is made as follows:

| | Grams |
|---|---|
| Wheat starch | 110 |
| Water | 170 |
| Tragacanth thickening (60/1000) | 250 |
| British gum | 200 |
| Potassium carbonate | 170 |
| Glycerine | 100 |
| | 1000 |

The two colors are printed simultaneously in a two-roller machine on cotton; the print is dried and treated for 5-10 minutes in the Mather-Platt apparatus and then in a reeling vat for 5 minutes at 25° C. with an aqueous solution containing per litre 7 grams of sodium hydroxide and 2 grams of sodium bichromate in addition to 200 or 300 grams of sodium chloride or potassium chloride or 10 to 20 grams of crystallized barium chloride. Instead of 7 grams of sodium hydroxide there may also be used 50 to 100 cc. of concentrated ammonia solution.

The cotton is then rinsed as described above, soured and soaped; there is obtained a fast brilliant orange and blue two-color print.

*Example 5*

A cotton fabric printed and steamed as described in Example 1 is drawn at room temperature in the course of 3 minutes through an aqueous solution containing per litre 200 grams of sodium chloride and 15 grams of sodium hydroxide. It is then rinsed cold and the print is finished as described above. The print is a brilliant orange.

Example 6

The following printing paste is prepared:

| | Grams |
|---|---|
| The product of the action of meta-benzoyl chloride sulfonic acid on the azo-dyestuff from 4-(4'-methyl)-phenoxyacetylamino-2:5-diethoxy-1-aminobenzene and the aniline of 2:3-hydroxynaphthoic acid | 80 |
| Water | 120 |
| Thiodiglycol | 150 |
| Urea | 100 |
| Neutral starch tragacanth thickening | 500 |
| Trisodium phosphate solution 1:4 | 50 |
| | 1000 |

Viscose crepe is printed with this paste and then dried and treated in the Mather-Platt apparatus for 5–10 minutes. It is then drawn at room temperature through a solution of trisodium phosphate of 15 per cent strength containing per litre 50 grams of sodium chloride, then lightly squeezed and left to lie over night in a rolled-up or folded condition at room temperature.

Thereafter, the print is finished as described above, the color being intensely blue.

Example 7

An artificial silk fabric printed and steamed as described in Example 2 is drawn at room temperature through a saturated sodium carbonate solution containing per litre 2 grams of sodium hydroxide, and then lightly squeezed and rolled up or folded, to be allowed to lie over night. The print is then finished as described above. The print is an intense brilliant scarlet red.

Example 8

10 parts by weight of bleached cellulose are ground with 500 parts of water. To the mass thus produced there is added, dissolved in 50 parts of hot water, 0.8 part of the product of the action of sulfobenzoyl chloride on the azo-dyestuff from diazotized 4:4'-dichloro-2-aminodiphenyl ether and the ortho-anisidide of 2:3-hydroxy-naphthoic acid, and the whole is thoroughly mixed. There is then added 0.5 part by volume of a sodium hydroxide solution of 36° Bé. which has been previously diluted with 5 parts of water, the whole is mixed again and 30 parts of a barium chloride solution of 20 per cent strength are added. After mixing the product is sized by the addition of 3 parts by volume of an aluminium sulfate solution of 20 per cent strength and 3 parts by volume of a resin size solution of 5 per cent strength.

The effluent water is completely clear and the paper is colored fast red.

Example 9

5 parts by weight of the product of the action of benzoic acid mono-sulfochloride on the azo-dyestuff from diazotized monobenzoyl-2:5-diaminohydroquinone-diethyl ether and 2:3-hydroxynaphthoic acid anilide, 30 parts of water, 50 parts of starch tragacanth thickening and 15 parts of thiodiglycol are mixed to form a printing paste. This is printed on a fabric which may consist of cotton, artificial silk from regenerated cellulose, natural silk, wool, or of a mixture of such fibers and the latter is dried. After steaming for 5–8 minutes in the Mather-Platt apparatus the fabric is subjected at 80–100° C. for 3–5 minutes to a moist atmosphere containing ammonia and is then rinsed, and soaped. There is obtained a fast intensely blue print.

Yellow prints are produced if in the printing color there is substituted 8 parts by weight of the product of the action of benzoic acid monosulfochloride on the ternary condensation product from 1 mol of cyanuric chloride, 2 mols of α-aminoanthraquinone and 1 mol of aniline, for the 5 parts by weight of the product of the action of benzoic acid mono-sulfochloride named above.

Example 10

The following printing paste is prepared:

| | Grams |
|---|---|
| The product of the action of benzoic acid sulfochloride on the azo-dyestuff from diazotized 2:5-dichloraniline and the ortho-anisidide of 2:3-hydroxynaphthoic acid | 80 |
| Water | 170 |
| Urea | 100 |
| Thiodiglycol | 150 |
| Neutral starch tragacanth thickening | 500 |
| | 1000 |

This paste is printed on viscose artificial silk fabric, which is then dried, treated in the Mather-Platt apparatus for 5–10 minutes and drawn in the course of 5–10 minutes through a moist chamber containing ammonia gas at 30–40° C. After washing and soaping there is obtained an intense fast scarlet red print.

A like result is obtained if the steamed fabric is exposed at room temperature for some time to an atmosphere of ammonia.

Example 11

The following printing paste is prepared:

| | Grams |
|---|---|
| The product of the action of meta-benzoic acid sulfochloride on the azo-dyestuff from diazotized meta-chloraniline and the anilide of 2:3-hydroxynaphthoic acid | 80 |
| Water | 270 |
| Thiodiglycol | 150 |
| Neutral starch tragacanth thickening | 500 |
| | 1000 |

After printing this paste on a cotton fabric, the latter is dried, steamed for 5–10 minutes in the Mather-Platt apparatus and then drawn through an atmosphere of steam containing ethylenediamine at 100° C. in the course of 3–5 minutes. The fabric is then rinsed and soaped; the print is a fast orange.

Similar results are obtained if other volatile organic bases, such as ethylamine, diethylamine, triethylamine, propylamine or the like are added to the steam.

Example 12

The following two printing pastes are prepared:

| | Grams |
|---|---|
| (a) The product of the action of meta-benzoic acid sulfochloride on the azo-dyestuff from diazotized 4:4-dichloro-2-amino-1:1-diphenyl ether and the ortho anisidide of 2:3-hydroxynaphthoic acid | 80 |
| Water | 270 |
| Thiodiglycol | 150 |
| Neutral starch tragacanth thickening | 500 |
| | 1000 |

|  | Grams |
|---|---|
| (b) Cibanone Green G double paste (Color Index No. 1172) | 150 |
| Potash thickening | 650 |
| Sodium sulfoxylate formaldehyde | 80 |
| Urea | 80 |
| Water | 40 |
|  | 1000 |

The two pastes are simultaneously printed on cotton and the fabric is dried, treated in the Mather-Platt apparatus for 5-10 minutes and then drawn in the course of 5-10 minutes at 30-40° C. through a moist atmosphere containing ammonia. It is then rinsed, soured if necessary, again washed and soaped at the boil.

There is obtained a very fast brilliant green-red two-color print.

What I claim is:

1. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification with alkaline agents in the presence of water-soluble salts which reduce the solubility of the acyl derivatives.

2. Process for producing dyeings on cellulose by means of water-soluble actyl derivatives of sparingly soluble dyestuffs which contain in the acyl radical the group lending solubility in water by treating such acyl derivatives on cellulose with saponifying agents, comprising effecting the saponification with alkaline agents in the presence of water-soluble salts which reduce the solubility of the acyl derivatives.

3. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification with aqueous caustic alkalies in the presence of water-soluble salts which reduce the solubility of the acyl derivatives.

4. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification with aqueous caustic alkalies in the presence of water-soluble salts which reduce the solubility of the acyl derivatives.

5. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification with aqueous caustic alkalies which are N/10 to N-solutions in the presence of water-soluble salts which reduce the solubility of the acyl derivatives.

6. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification with aqueous caustic alkalies which are $n/10$ to $n$-solutions in the presence of water-soluble salts which reduce the solubility of the acyl derivatives.

7. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification with aqueous caustic alkalies which are N/10 to N-solutions in the presence of water-soluble salts having a salting-out effect.

8. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification with aqueous caustic alkalies which are $n/10$ to $n$-solutions in the presence of water-soluble salts having a salting-out effect.

9. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification with aqueous caustic alkalies which are N/10 to N-solutions in the presence of sodium chloride as water-soluble salt having a salting-out effect.

10. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification with aqueous caustic alkalies which are $n/10$ to $n$-solutions in the presence of sodium chloride as water-soluble salt having a salting-out effect.

CHARLES GRAENACHER.